United States Patent [19]

Swanberg

[11] 3,784,812

[45] Jan. 8, 1974

[54] DATA INSERTION APPARATUS

[75] Inventor: Melvin E. Swanberg, Claremont, Calif.

[73] Assignee: Xerox Corporation, Stamford, Conn.

[22] Filed: May 22, 1972

[21] Appl. No.: 255,739

[52] U.S. Cl. ........................ 355/41, 240/122, 250/75

[51] Int. Cl. ........................ G03b 27/52

[58] Field of Search ........................ 240/122; 250/75; 355/7, 14, 40–43

[56] References Cited

UNITED STATES PATENTS

| | | | |
|---|---|---|---|
| 3,094,036 | 6/1963 | Benson | 355/7 |
| 3,262,355 | 7/1966 | Kleist et al. | 355/41 X |
| 3,400,631 | 9/1968 | Rauscher | 355/7 X |

*Primary Examiner*—
*Assistant Examiner*—Richard A. Wintercorn
*Attorney*—James J. Ralabate et al.

[57] ABSTRACT

Microfiche enlarger printer apparatus which includes random frame selection circuitry wherein the frame selection input data is inserted via a novel panel, the front panel surface having positions for data entry corresponding to the microimage format on a microfiche card. The apparatus further includes logic and storage components for allowing entry of the frame selection data for one microfiche card prior to the completion of the reproduction cycle of the selected frames on another microfiche card and which is responsive to only the first and last panel positions actuated by an operator.

The panel further includes display means at each panel position, for providing the operator a visual indication of the panel positions which have been actuated.

11 Claims, 8 Drawing Figures

PATENTED JAN 8 1974 3,784,812

SHEET 3 OF 7

FIG. 4
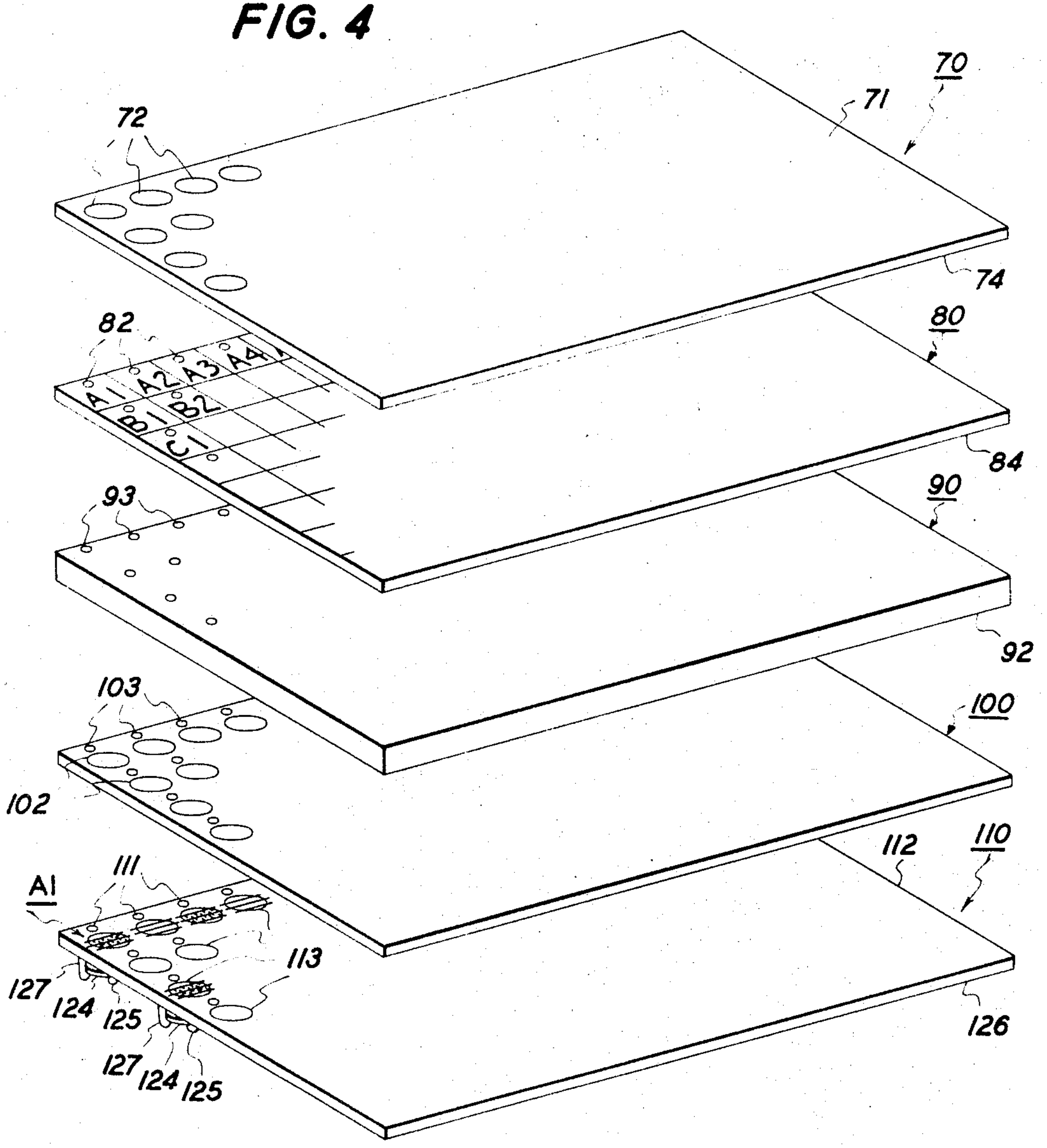
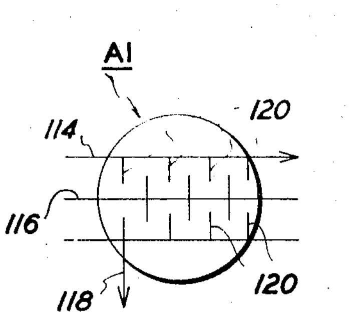
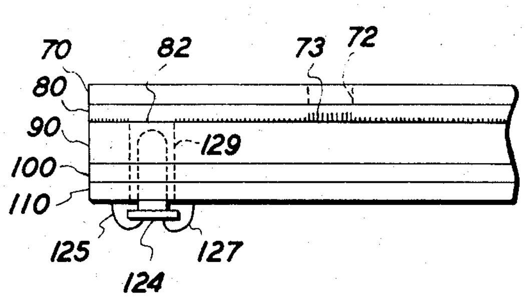
FIG. 4a FIG. 4b

PATENTED JAN 8 1974

3,784,812

SHEET 7 OF 7

DATA INSERTION APPARATUS

BACKGROUND OF THE INVENTION

As is well known, in recent years the steadily increasing size of various industries, and especially the scientific information available to the Government, has required an enormous increase in the number of variety of technical records and reports that must be made, maintained, disseminated and be kept available for use.

In the field of microfilming, a microfiche is a single sheet of film containing sequences of microimages and is provided with a border area for titles, authors, names, classification data, etc., which can be read by the unaided eye. A microfiche is an ideal form for containing related images and is unsurpassed when compared to prior art systems of microfilming for economy, storage, ease of handling and print-out for images that represent many pages of a single report or books that are to be occasionally or extensively reproduced for wide distribution. A microfiche may contain anywhere from 20 to 112 microimages, depending upon the size of the form film sheet, for recording and storing images of periodicals, books or reports having 20 to 112 pages.

U.S. Pat. No. 3,372,627 discloses a prior art xerographic processing system that is combined with microfiche handling apparatus for moving each microfiche containing microimages seriatim, transversely and longitudinally, across a fixed scanning system whereby each microimage is transported past the optical axis of a projection system in timed relation to the movement of a sensitized xerographic plate whereby the light image of each of the microimages is effective to form an electrostatic latent image on the xerographic plate in an enlarged configuration of the light image. Thereafter, the electrostatic latent image is developed to form a xerographic powder image of the image on the drum. A paper feeding device is arranged to present a sheet of transfer material into surface contact with the xerographic plate, and the electrostatic powder image is transferred to the transfer material. After image transfer, the transfer sheet material is passed through a fusing apparatus wherein the xerographic powder image is permanently affixed to the sheet. The apparatus also includes means for controlling the operation of the microfiche apparatus whereby a predetermined number of reproductions of each microfiche may be made, as required.

Although apparatus for enlarging and printing each microimage have been available in the prior art, such as shown in the aforementioned U.S. Pat. No. 3,372,627, disadvantages associated with such apparatus have limited their usefulness. For example, in any system that requires an interface with an operator, it would be desirable to provide a simplified input system whereby input data is easily and accurately entered into the machine with a minimum of operator interface and expense. For example, in the aforementioned patent, the control section includes four switches whereby the operator selects any microimage frame that he desires to commence a reproduction run, selects the last frame of his run and initiates the automatic reproduction of all of the microimage frames that extend between his selected starting and terminating frames.

The operator, in selecting a frame portion, visually scans the microfiche before insertion into the apparatus to select the desired frame portion. Upon determining the column and row position of the starting and terminating frames, the four switches are adjusted to the corresponding setting. Operator error may occur during the time the microfiche is scanned, the four switches are adjusted and the print cycle is initiated. Since there are no means for indicating to the operator that an erroneous frame selection may have been chosen, activation of the "Print" switch will initiate the reproduction of the wrong microfiche frames. In addition, input data corresponding to a selected frame sequence of a second microfiche card cannot be entered i.e., the switch positions adjusted to the settings corresponding to the frame sequence of the second microfiche card until the selected frame sequence of the microfiche presently in the microfiche enlarger printer is completed.

SUMMARY OF THE PRESENT INVENTION

The present invention overcomes the deficiencies of the prior art as set forth hereinabove by providing a novel microfiche reproduction system for producing high volumes of output documents more reliably, less expensively and more accurately than those found in the prior art machines. In particular, the microfiche enlarger printer of the present invention includes a novel panel, or keyboard configuration the front surface of which is smooth and whose format arrangement corresponds to the format arrangement of the microfiche card. For example, if the microfiche cards comprise a 14 column, eight row matrix having 112 frames thereon, the panel of the present invention is arranged in a similar manner, i.e., having 112 panel positions, or buttons, arranged in a corresponding 14 row, eight column arrangement. The panel also includes light emitting diodes associated with each panel position to indicate to the operator the particular panel position actuated so that the operator, before initiating the print cycle, can visually check that the correct frame sequence has been selected. If the selection was incorrect, the system can be reset and the proper panel positions then actuated. Associated with the panel is logic and storage means which stores the data corresponding to the row and column position of a selected frame sequence on a first microfiche card, and enables the operator to insert the row and column data of a second microfiche card before completion of the reproduction cycle of the selected frames on another microfiche card.

It is an object of the present invention to provide improved data insertion apparatus for use in microfiche apparatus.

It is a further object of the present invention to provide improved data insertion apparatus for use in microfiche apparatus wherein the format, or positions, of the alphanumeric legends on the data input panel surface corresponds to the microimage format on the microfiche card.

It is still a further object of the present invention to provide a data insertion panel for use in microfiche apparatus wherein the format, or positions, of the alphanumeric legends on the panel corresponds to the arrangement of microimages on the microfiche card and which includes a display light associated with each panel position, the actuation of a particular panel position causing its associated display light to be energized.

It is a further object of the present invention to provide improved data insertion apparatus for use in microfiche apparatus wherein input data corresponding to a desired selection of frames on one microfiche card may be entered into the apparatus via an input panel while reproduction of the selected frame sequence of another microfiche card is still being performed and which is responsive only to the first and last panel positions actuated by the operator for a selected frame sequence.

It is still a further object of the present invention to provide a novel pressure sensitive panel for data insertion.

It is a further object of the present invention to provide a novel control system for rapidly positioning a support member to a first position from an initial position and for sequentially positioning said support member from said first position to a second position.

DESCRIPTION OF THE DRAWINGS

For a better understanding of the invention as well as other objects and further features thereof, reference is made to the following description which is to be read in conjunction with the following drawings wherein:

FIG. 4 is an exploded view of the novel panel of the present invention;

FIG. 4*a* shows in detail a portion of the panel shown in FIG. 4;

FIG. 4*b* is a cross-sectional view of the assembled panel;

DESCRIPTION OF THE PREFERRED EMBODIMENT

Figure 1:
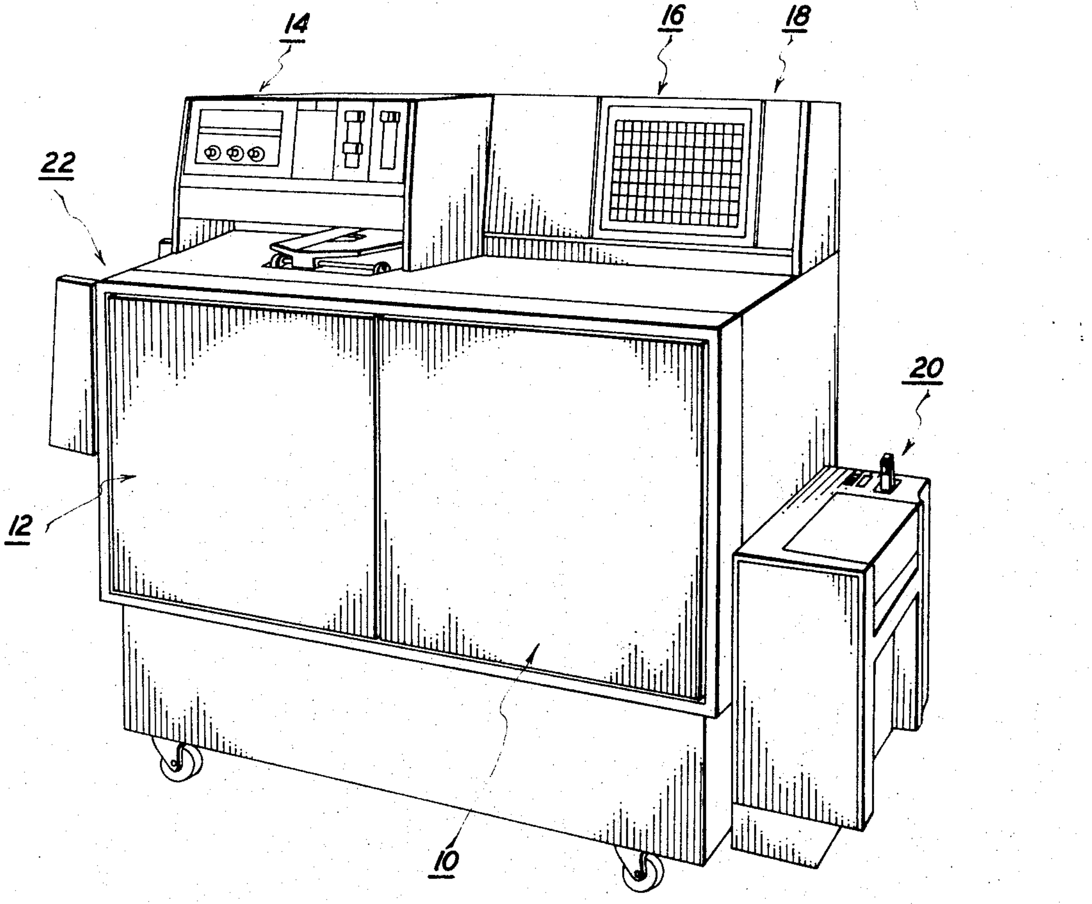
FIG. 1 is a perspective view of an automatic xerographic processing apparatus embodying the invention.

In the particular arrangement shown in the drawings, the invention is incorporated in a microimage reproduction system that is a fully automatic, continuous printer for reproducing information contained on microfiche sheets. This equipment reproduces copy on individual sheets of paper, that may have a width up to 9 inches and a length of 14 inches in a magnification ratio of approximately 16 × which is enlarged to the full width of the sheet of material. Referring to FIG. 1, the system may be considered to include seven distinct sections for housing the several elements thereof; namely, the base section 10 for housing the xerographic drum; the paper feeding apparatus, as well as the devices for effecting the xerographic functions of plate charging, xerographic developing, image transfer, brush cleaning, etc.; a section 12 for housing the microfiche transport apparatus, including the servomotors associated therewith, the bulk of the optical system, and certain of the electrical equipment required in the system, control panel 14 whereon the operator may initiate machine operation, panel or keyboard 16 for operator selection of the frames to be reproduced, section 18, located behind keyboard 16, housing the panel logic and storage components, cut sheet input station 20 and output copy station 22.

Figure 2:
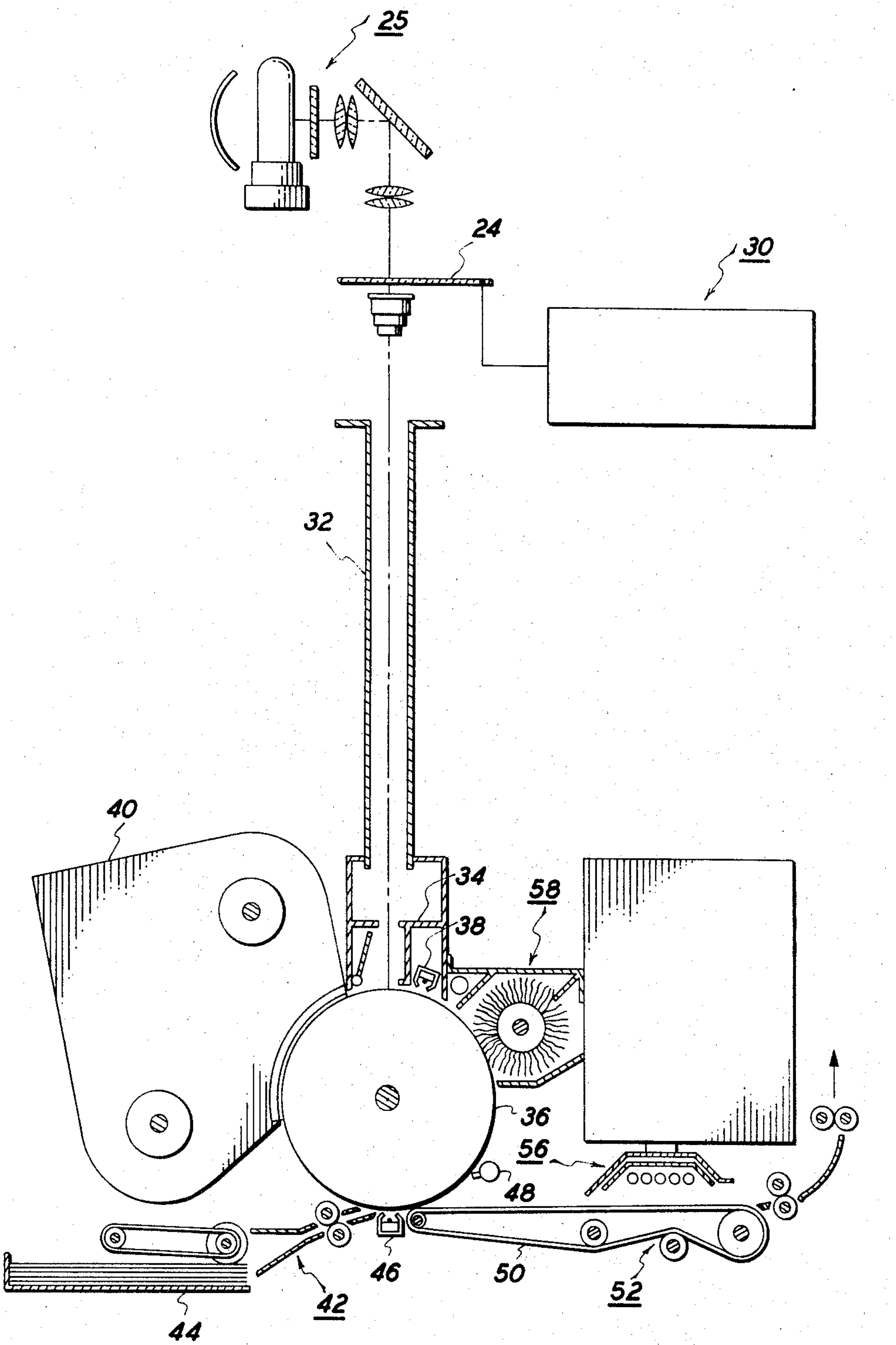
FIG. 2 illustrates the steps utilized in the apparatus of FIG. 1.

For a general understanding of the xerographic processing system in which the invention is incorporated, reference is had to FIG. 2 in which the various system components are schematically illustrated. As in all xerographic systems, a light image of copy to be reproduced is projected onto the sensitized surface of a xerographic plate to form an electrostatic latent image of copy to be reproduced. Thereafter, the latent image is developed with an oppositely charged developing material to form a xerographic powder image on the plate surface. The powder image is then electrostatically transferred to a support surface to which it may be fused by any suitable form of fusing device, whereby the powder image is caused to adhere permanently to the support surface.

In the microfiche enlarger printer apparatus in which the present invention may be utilized, a microfiche sheet holder containing a microfiche 24 is placed in a transport mechanism indicated by the block 30, from which it is sequentially moved first in one direction and then in another direction. Suitable driving means are provided for effecting the two-directional movement of the microfiche 24 whereby it is caused to move past the optical axis of light projecting system 25 for the purpose of scanning the microimages with a scanning light line. The light image of each microimage arranged on the microfiche is projected downwardly through an adjustable objective lens assembly 32 and through a slit aperture assembly 34 and onto the surface of a xerographic plate in the form of a drum 36.

The xerographic drum 36 includes a cylindrical member mounted in suitable bearings in the frame of the machine and is driven in a counterclockwise direction by a motor at a constant rate that is proportional to the scan rate of each of the microimages on the fiche, whereby the peripheral rate of the drum surface is proportional to the rate of movement of the projected light image. The drum surface comprises a layer of photoconductive material on a conductive backing that is sensitized prior to exposure by means of a corona generating device 38.

The exposure of the drum to the light image discharges the photoconductive layer in the areas struck by light, whereby there remains on the drum a latent electrostatic image in image configuration corresponding to the light image projected from each of the frames of a minified data fiche. As the drum surface continues its movement, the electrostatic latent image passes through a developing station in which there is positioned a developer apparatus including a casing or housing 40 having a lower or sump portion for accumulating developing material. A bucket-type conveyor having a suitable driving means may be used to carry the developing material to the upper part of the developer housing where it is cascaded down over a hopper chute on the xerographic drum.

As the developing material is cascaded over the xerographic drum, toner particles are pulled away from the carrier component of the developing material and deposited on the drum to form powder images, while the partially denuded carrier particles pass off the drum into the developer housing sump. As toner powder images are formed, additional toner particles must be supplied to the developing material in proportion to the amount of toner deposited on the drum. For this purpose, a suitable toner dispenser may be used to accurately meter toner to the developing material.

Positioned next and adjacent to the developing station is the image transfer station which includes a sheet feeding mechanism adapted to feed sheets of paper successively to the developed image on the drum at the transfer station. This sheet feeding mechanism, generally designated 42, includes a sheet source such as a tray 44 for a plurality of sheets of a suitable transfer material that is typically sheets of paper or the like, a separating roller adapted to feed the top sheet of the stack to feed rollers which direct the sheet material into contact with the rotating drum at a speed preferably slightly in excess of the rate of travel of the surface of the drum in coordination with the appearance of the developed image at the transfer station. In this manner, the sheet material is introduced between the feed rollers and is thereby brought into contact with the rotating drum at a speed preferably slightly in excess of the rate of travel of the surface of the drum in synchronization with the appearance of the developed image at the transfer station. In this manner, the sheet material is introduced between the feed rollers and is thereby brought into contact with the rotating drum at the correct time and position to register with the developed image. To effect proper registration of the sheet transfer material with the feed rollers and to direct the sheet transfer material into contact with the drum, guides are positioned on opposite sides of the feed rollers.

The transfer of the xerographic powder image from the drum surface to the transfer material is effected by means of a corona transfer device 46 that is located at or immediately after the point of contact between the transfer material and the rotating drum. The corona transfer device 46 is substantially similar to corona discharge device 38 in that it includes an array of one or more corona discharge electrodes that are energized from a suitable high potential source and extend transversely across the drum surface and are substantially enclosed within a shielding member. In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere electrostatically to the surface of the transfer material.

Immediately subsequent to the image transfer station is positioned a transfer material stripping apparatus or paper pickoff mechanism, generally designated 48, for removing the transfer material from the drum surface. This device includes a plurality of small diameter, multiple outlet conduits of a manifold that is supplied with pressurized aeriform fluid through the outlet conduits into contact with the surface of the drum slightly in advance of the sheet material to strip the leading edge of the sheet material from the drum surface and to direct it onto an endless conveyor 50 of a horizontal transport mechanism 52 whereby the sheet material is carried to a fixing device or heat fuser 56, whereby the developed and transferred xerographic powder image on the sheet material is permanently fixed thereto.

After fusing, the finished copy is preferably discharged from the apparatus at a suitable point for collection externally of the apparatus.

The next and final station in the device is a drum cleaning station 58, having positioned therein a suitable drum cleaning device adapted to remove any powder remaining on the xerographic drum after transfer.

Any residual electrical charge remaining on the xerographic drum is dissipated by light from a lamp adjacent the drum surface.

Suitable drive means drive the drum and the mechanism for sequentially scanning a microfiche at predetermined speeds relative to each other and included are means to return the microfiche to its respective longitudinal and transverse starting positions after a reproduction cycle and means to effect operation of the bucket-type conveyor, toner dispenser, endless conveyor, the separating roller and feed rollers being controlled in a manner to permit the feed of a sheet of transfer material into registered impression contact with the developed image on the xerographic drum as it is rotated through the transfer station.

Figure 3:
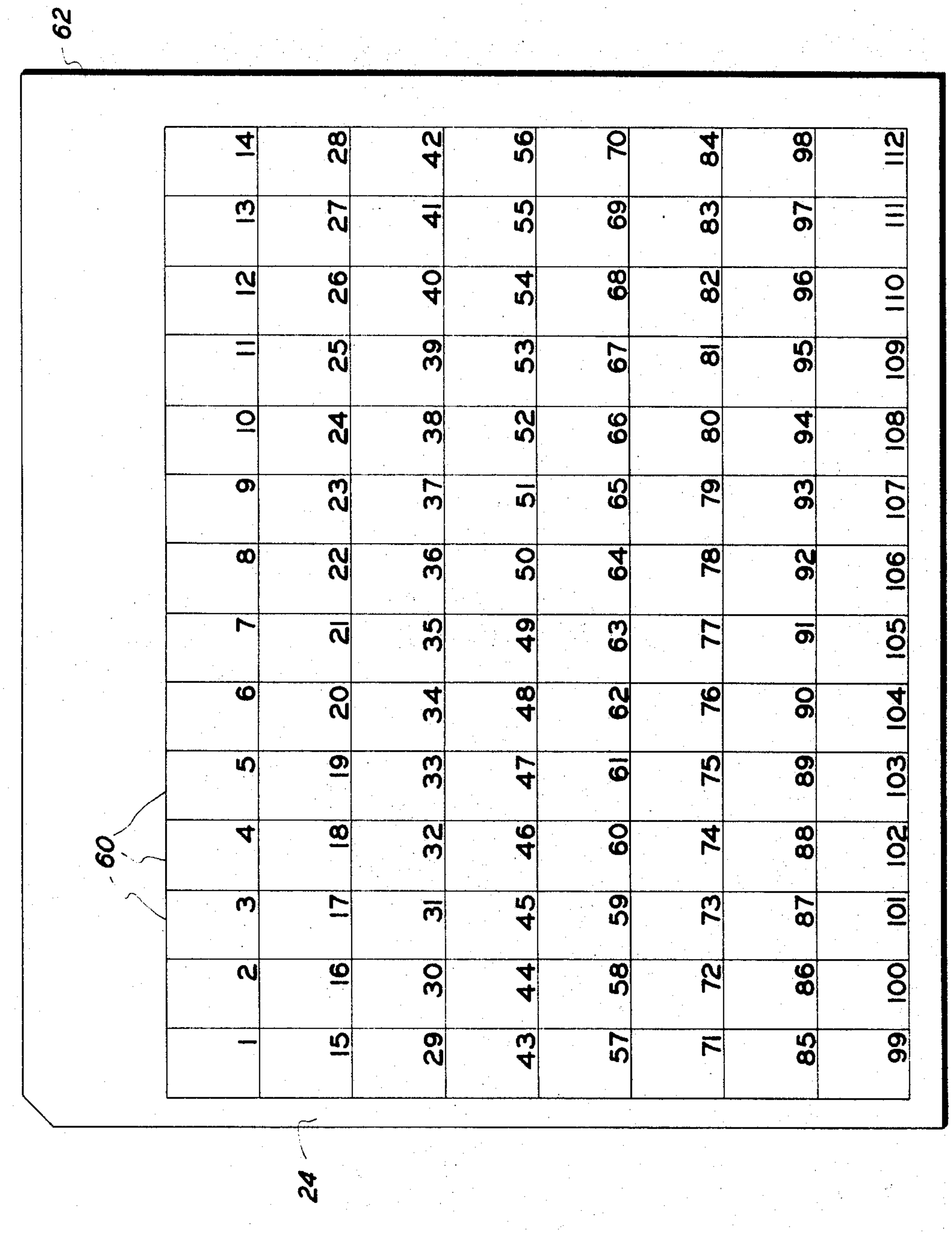
FIG. 3 is a schematic illustration of a typical microfiche card showing the arrangement of microimages thereon.

Since the present invention, in a preferred embodiment, involves an apparatus for the automatic print-out of microfiche, a better understanding of the apparatus will require a brief description of a microfiche. Microfiche cards are available in various sizes, some of which have been standardized. The size of a microfiche will determine the number of frames that comprise it; for example, the fiche illustrated in FIG. 3 is nominally a 4 × 6 inch fiche and contains 112 single frames. These frames are arranged in eight rows, running horizontally, as viewed in FIG. 3, and fourteen columns running vertically. For purposes of description, movement of a fiche along a row will be designated as longitudinal movement, and movement along a column will be designated transverse movement.

As previously stated, the fiche 24 contains 112 film frames designated as 60, and these are arranged in horizontal rows and vertical columns with the left-hand column, the first column and the top row as the first row. The frames 60 have been numbered from 1 to 112 in the order in which they are scanned. In other words, scanning generally commences with the scanning of the frame located in the first column, first row, and proceeds until all of the frames have been scanned in the first row. The next frame to be scanned after the last frame or frame No. 14 has been scanned is the second frame in column 1, namely, frame number 15, which is the first frame in the second row. In this manner, if all 112 frames are utilized, the fiche is scanned sequentially from left to right and top to bottom.

Scanning may also proceed in the reverse direction i.e., having the scanning initiated at the last frame (frame 112) and proceeding from right to left. In the particular embodiment described with reference to FIG. 7, reverse scanning is utilized.

Generally, the fiche is provided with a narrow marginal area 62 upon which is printed, or otherwise placed for reading by the unaided eye, the title of the subject matter contained in the frames of the fiche, the author, or any other useful information, file data summary, etc.

Figure 5:
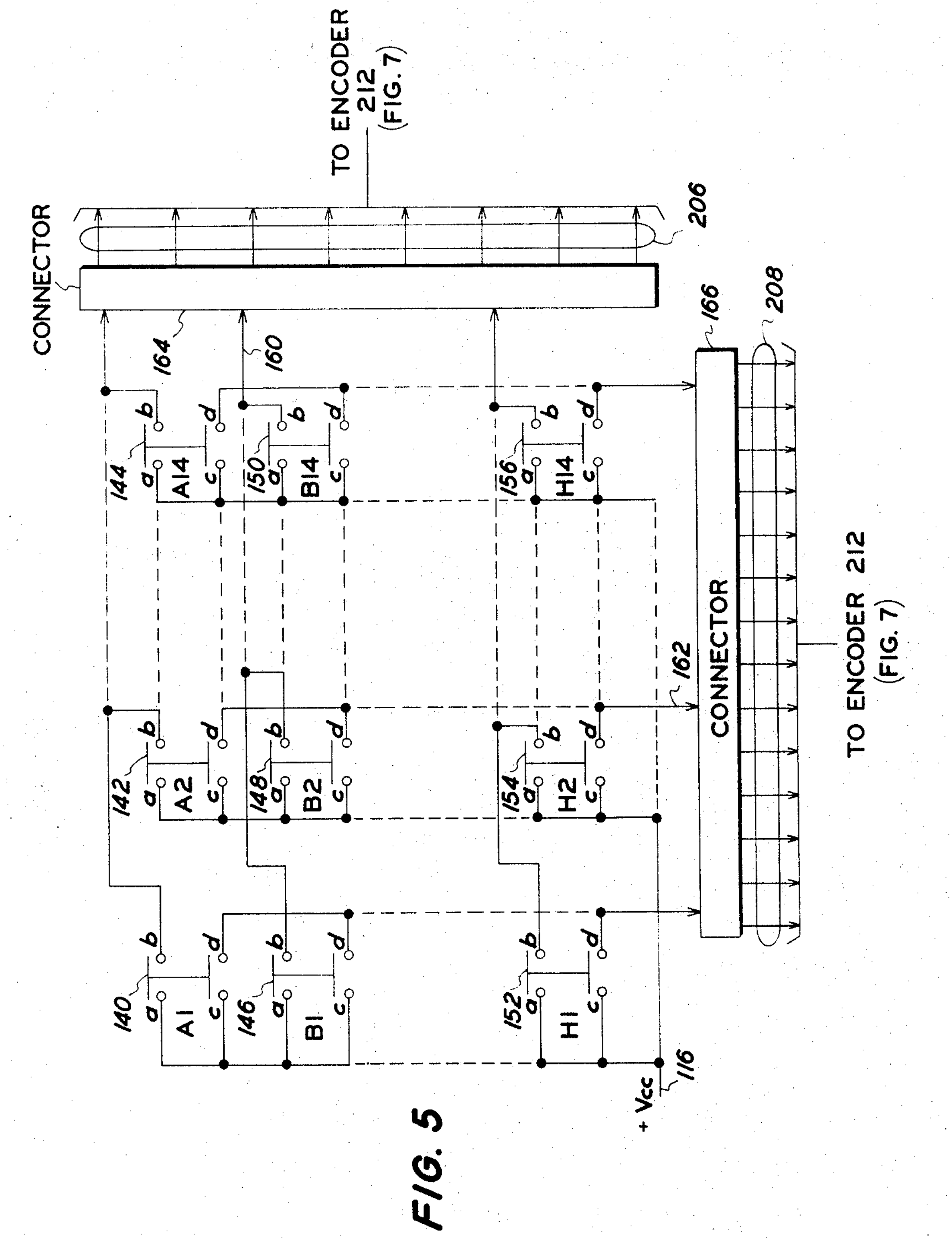
FIG. 5 is a schematic diagram illustrating the operation of the panel switching action when pressure is applied to a selected panel position.

Referring now to FIG. 4, an exploded view of novel panel 16 showing the various components thereof is illustrated. The panel 16 allows front panel interconnections and switches to be inexpensively manufactured using printed circuit techniques and comprises a thin plastic sheet 70 having a plurality of finger sized holes 72 formed thereon. In the embodiment illustrated, the number and arrangement of holes 72 corresponds to the number and arrangement of the microimages on microfiche card 24. In the particular example illustrated, 112 holes, or panel positions, are formed in an 8 row, 14 column format. All the holes are not shown for purposes of clarity. Overlying surface 74 of sheet 70 is a thin plastic sheet 80 such as Mylar, a trademark of the E. I. Dupont de Nemours Corporation for polyethylene teraphthalate, a polyester film. As illustrated, alphanumeric symbols are silk-screened on surface 84 of sheet 80 in a predetermined arrangement. For example, the first row from left to right is labeled A1, A2 . . . A14, the second row B1, B2 . . . B14, etc. Except for circular areas 82 and the alphanumeric symbols, surface 84 is coated with an opaque material. The circular transparent area 82 of sheet 80, consistent with the diameter of light emitting diodes to be utilized as explained hereinafter, will allow light emitted by the light emitting diode to be seen by the keyboard operator. Overlying surface 84 is sheet 90, made of conducting material such as silicone rubber, which is deformable in response to a force applied thereto. A plurality of holes 93 are formed on sheet 90 which are aligned with transparent areas 82 on sheet 80. Overlying surface 92 of conducting sheet 90 is plastic sheet 100, such as Mylar, having a plurality of holes 102 and 103 formed thereon. Holes 102 are in registry with holes 72 formed on sheet 70 and the symbols formed on surface 84 of sheet 80, whereas holes 103 are in registry with holes 93 and transparent areas 82. The last component of the panel assembly is a double sided printed circuit board 110. Printed circuit conductors 113 are formed on surface 112 of printed circuit board 110 within an area defined by each hole 102 on sheet 100. As explained hereinafter, when the operator places his finger on a selected panel position, or hole, 72 and applies slight pressure thereto, these metallic conductors, normally not in contact, will be effectively brought into contact by action of conducting sheet 90. This switching operation is schematically illustrated in FIG. 5. A plurality of holes 111 are formed on printed circuit board 110 and are aligned with holes 93 and 103 and transparent area 82.

FIG. 4*a* is a blowup view of panel position A1 and details the printed circuit area corresponding thereto. The printed circuit area of each panel position comprise printed circuit conductor 114, corresponding to the row position of the A1 panel position, and conductor 118 corresponding to the column position of the A1 panel position. Printed circuit conductor portions 120, operate to connect conductors 114 and 118 to the common 116 when pressure is applied to the selected panel position i.e., conducting sheet 90 is deformed to a position such that the row and column conductors are connected to the common, the common having a source of potential applied thereto and being affixed permanently to conducting sheet 90 (although shown on surface 112 of sheet 110 for illustrative purposes). Mounted to printed circuit board 110 are a plurality of light emitting diodes 124, such as the gallium arsenide phosphide diodes Type TIL 209, manufactured by Texas Instruments, Inc., Dallas, Texas, which are arranged to be in registration with the transparent areas 82 on sheet 80, as shown in FIG. 4*b*, such that the light generated by an energized light emitting diode is visible to an operator observing surface 71 of front panel 70. The anode 125 and cathode 127 terminals of light emitting diodes 124 are connected to conductors formed on surface 126 of printed circuit board 110, and, as will be explained more fully hereinafter with reference to FIG. 6, the energization of a particular light emitting diode is accomplished by control circuitry which is responsive to a selected panel position. Sheets 70, 80, 90, 100 and 110 are affixed to the respective adjacent sheets by a suitable adhesive material.

As will be described hereinafter in reference to FIG. 5, each panel position forms a double contact centered in the alphanumeric symbol, or legend, area. The contacts are connected in an 8 × 14 XY array with the closure thereof connecting the X and Y terminals of each switch position to the common 116. The light emitting diodes 124 are also connected in an 8 × 14 XY array but independent of the switch contact connections. The anodes of the light emitting diodes are connected to the row lines and the cathodes thereof are connected to the column lines.

As shown in FIG. 4*b*, the light emitting diodes 124 (only one shown for illustrative purposes) are mounted through mounting hole 129 in layers 90, 100 and 110 (corresponding to holes 93, 103 and 111 in FIG. 4). Transparent area 82 in sheet 80, is in alignment with the light emitting diode mounting hole 129. Top layer 70 is transparent and is aligned with finger holes thereon aligned with the legend A1, A2 etc. (legend area indicated by reference numeral 73) on surface 84 of sheet 80. The light emitting diodes 124 are visible above the finger holes 72, through the transparent top layer 70 and transparent area 82 of layer 80.

Referring now to FIG. 5, a schematic diagram illustrating the switching sequence of the panel of the present invention is shown. Reference numerals 140, 142 . . . 156 refer to the front panel position switches (the H shaped element corresponding to function of conductor sheet 90) and correspond to the alphanumeric symbols A1, A2 . . . H14, respectively. The double throw switches comprise four terminals; two upper terminals *a*, *b* and two lower terminals c, d. Terminals *a* and *c* of each switch are connected in common to a source of positive potential VCC applied to common lead 116 and terminal *b* of the switches in the same row are connected to a common lead and terminal *d* of the switches in the same column are connected in common.

In operation, the operator applies slight pressure to the desired panel position, for example, position B2. The applied pressure forces conducting sheet 90 (FIG. 4) into contact with terminals *a*, *b*, *c*, and *d*, connecting terminals *a* and *c* and *b* and *d*. A potential +VCC is coupled via contacts a and c to output lead 160, the energization thereof indicating the row position of B2. At the same time, potential +VCC is coupled to lead 162 via contacts *b* and *d*, the energization thereof indicating the column position of B2.

The row outputs are coupled to a connector 164 and the column outputs are coupled to connector 166, both connectors being mounted on the panel 16, (not shown). The output of the connectors 164 and 166 are coupled to encoder 212 as described hereinafter in reference to the block diagram shown in FIG. 7.

Figure 6:
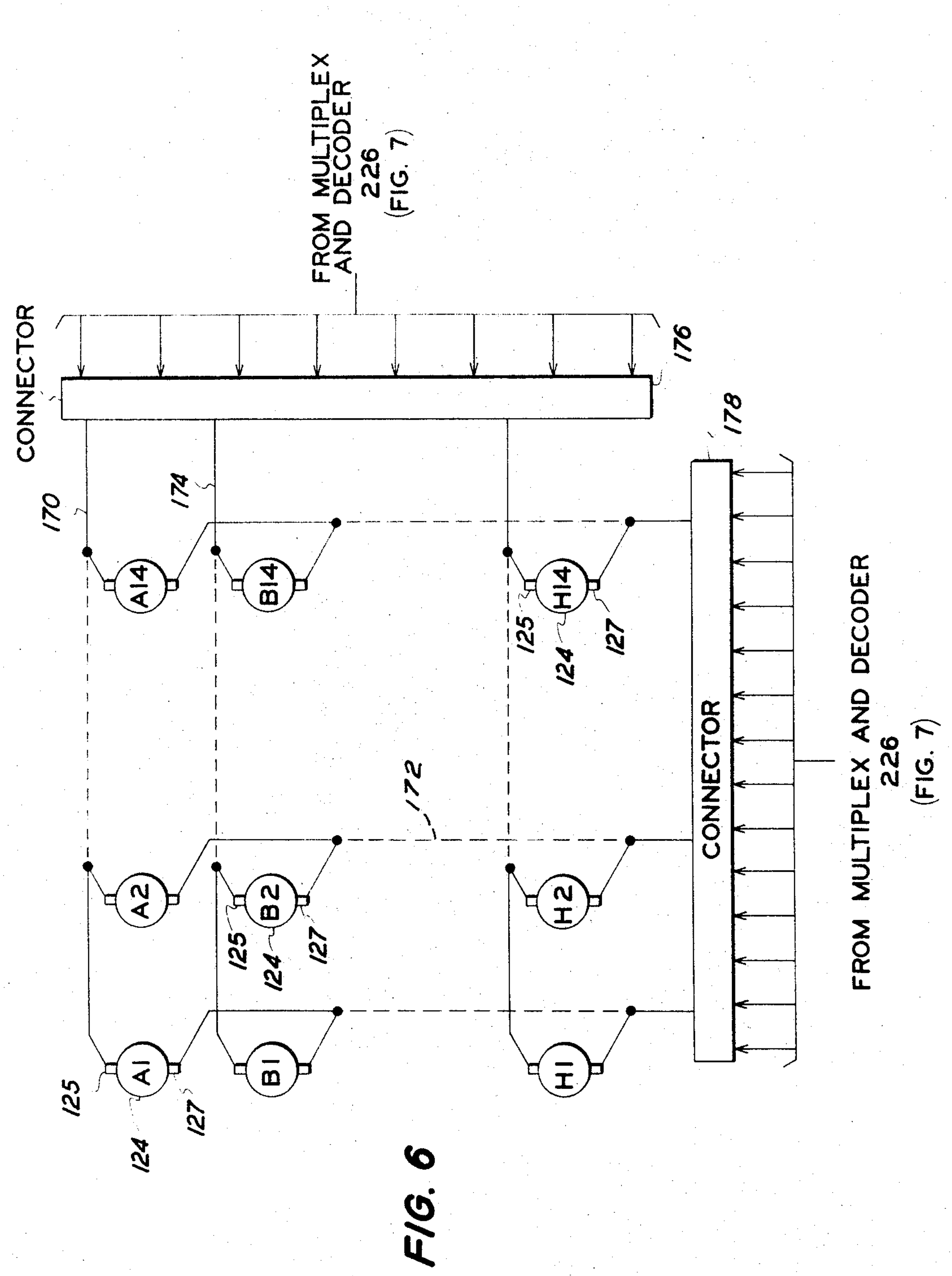
FIG. 6 is a schematic diagram of the switching matrix for energizing the light emitting diodes mounted on the panel shown in FIG. 4.

FIG. 6 is a schematic diagram of the electrical signal connections to the keyboard light emitting diodes 124.

The light emitting diodes 124 are positioned in the manner set forth in the discussion of FIG. 4. Each light emitting diode has anode terminals 125 and cathode terminals 127. The anode terminals of a row are connected to a common i.e., row A anode terminals are connected to lead 170 and the cathode terminals of a column are connected to a common lead i.e., row 2 cathode terminals are connected in common to lead 172.

When the operator actuates a particular panel position, for example, position B2, the logic circuitry connected to the panel will generate a logic signal on lead 174 via connector 176 which is positive with respect to the logic signal applied to lead 172 via connector 178. The energization of leads 172 and 174 with the proper logic levels will cause the light emitting diode corresponding to position B2 to emit visible light, indicating to the operator the particular panel position which was actuated.

Figure 7:
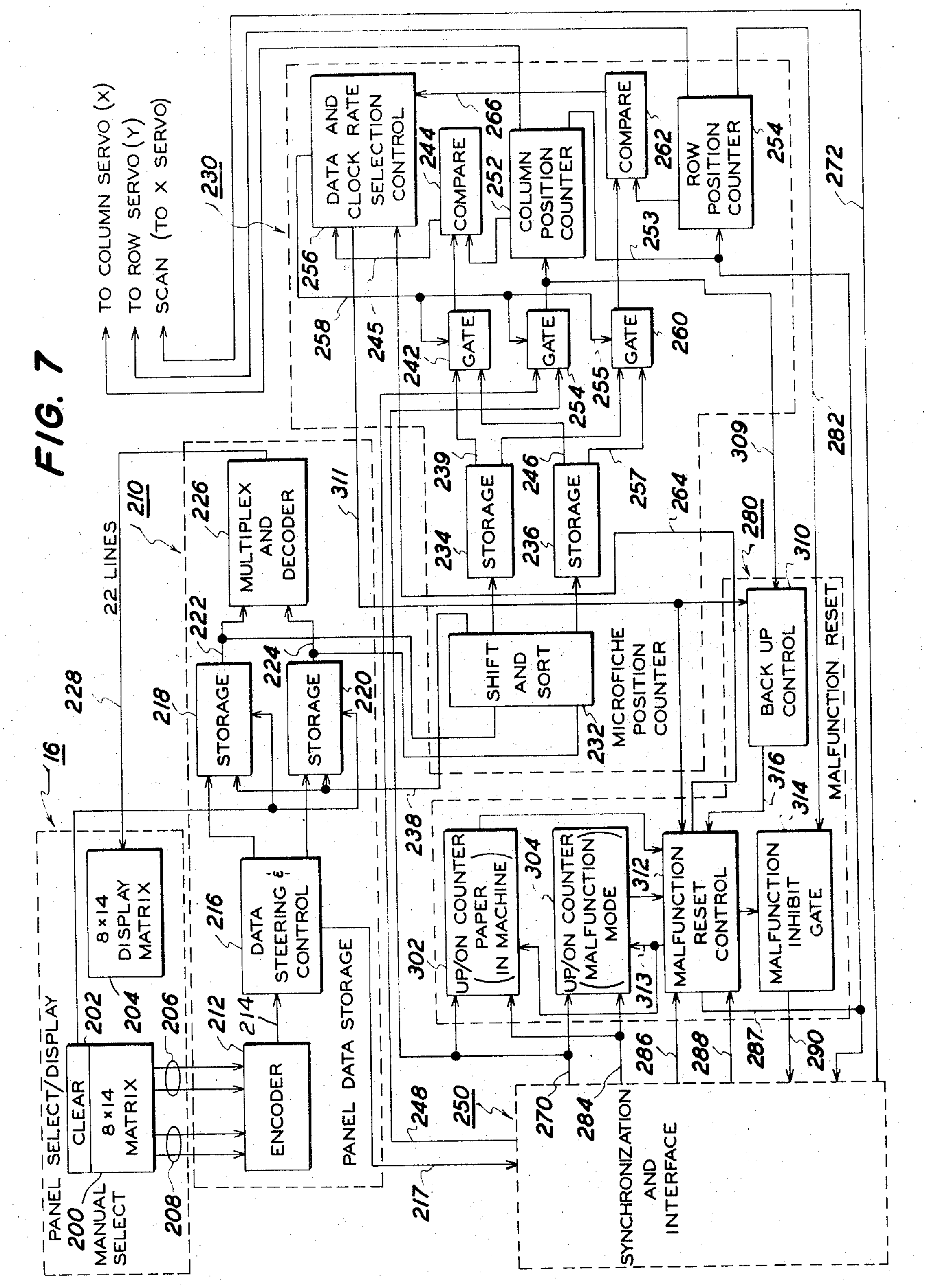
FIG. 7 is a block diagram of the logic and storage components utilized to generate the appropriate control signals in response to actuation of the panel positions shown in FIG. 4.

FIG. 7 is a block diagram of the present invention. The blocks forming major components of the system have been enclosed by dashed lines. Panel select/display block 16 includes the panel position matrix 200 and clear panel position 202. Block 204, shown separated from the panel position matrix 200, refers to the 8 × 14 light emitting diode display matrix mounted on surface 126 of printed circuit board 110 (FIG. 4). As set forth hereinabove, the operator manually selects and presses the desired panel positions (start and terminating frames) closing appropriate panel contacts. A signal is generated on one of the eight row lines 206 (two lines shown in the figure) and one of the fourteen column conductor lines 208 for each frame selected. The output on row lines 206 and column lines 208 are coupled into panel data storage means 210. The panel data storage means 210 includes encoder 212 the input of which receives the row and column conductor lines 206 and 208. The panel operated contacts apply current to encoder 212. The output from encoder 212, appearing on lead 214, is a seven bit binary data code corresponding to the respective panel position operations. Data steering and control means 216 operates to direct the binary data from encoder 212 to storage means 218 for the first panel position pressed and to storage means 220 for the last panel position pressed. Thus, for example, if three panel positions are pressed, the binary data code corresponding to the third panel position would be stored in storage means 220. The binary code corresponding to the second panel position depressed would be replaced by the binary code corresponding to the third, or last, panel position. It is customary to encode a document on a microfiche card with page order running from left to right in the columns and descending from top to bottom in the rows. It is also customary to encode the first page in the B3 frame area, the A row being used as an unaided visual title area, and B1 and B2 as a demagnified title area. Some users of microfiche use other formats. If the users microfiche file has been standardized as to the location of the first page, such as B3, the operator will depress this position first. When depressed, the data is stored in both storage means 218 and 220. When a second panel position is depressed, the data for this second position is stored in only storage means 220, the first data remaining in 218. Each time a new panel position is depressed, this new data replaces that in only 220. Thus, if the users microfiche file is standardized, as set forth hereinabove it is only necessary to depress one panel position (after depressing the standard first page position) for each new microfiche frame selection to be printed.

The "clear" button clears both storage means 218 and 220, permitting the insertion of a new "first position" into storage means 218 and 220.

If only one panel position has been depressed, this data is stored in both 218 and 220 causing only that one frame to be printed.

The logic output appearing on lead 217 inhibits starting the print cycle if data has not been stored from the keyboard, i.e., if the clear button 202 has been depressed and has not been followed by depressing at least one panel position. The outputs from storage means 218 and 220, on seven conductors 222 and 224, respectively, are coupled to multiplex and decoding means 226. The decoding portion of means 226 decodes the binary code input applied thereto and couples the decoded output to the 8 × 14 display matrix 204 via conductor 228 (actually 22 conductors), the light emitting diodes associated with the selected panel position thereby being energized. As explained hereinabove with reference to FIG. 6, the energization of the display matrix is independent of the panel switching matrix and provides a technique for confirming that the logic circuitry is operating properly, in addition to providing a visual indication to the operator of the panel position selected. Due to the possibility that a light emitting diode may be erroneously energized, the sequence of energization is accomplished by multiplexing techniques. The seven bit numbers stored in 218 and 220 must be decoded into line and column format to energize a light emitting diode. When so decoded and excitation is applied to the appropriate row and column, the light emitting diode at the intersection of the row and column is lit. If two rows and two columns were to be excited, there would be four intersections and four light emitting diodes would light, two desired and two extraneous ones. Therefore, a single decoder is used to convert the seven bit number to appropriate row and column excitation. This decoder receives the seven bit data from a multiplex circuit; i.e., an electronic switching circuit which alternates its seven bit output between the two seven bit inputs received from storage means 218 and 220.

Thus, the decoder receives a seven bit input which alternates between two numbers corresponding to the two positions selected and in storage. The row and column excitation output from the decoder thus alternates between two different pairs of rows and columns, only one row and one column being excited at any one time. Since there is only one intersection at any one time and only two different intersections alternating at the switching rate, only two light emitting diodes are illuminated, on and off alternately at the switching rate. The switching rate is not critical but should be above the flicker rate to give the appearance of continuous illumination. The seven bit binary number on lines 222 and 224 are coupled to microfiche position control means 230. Shift and sort means 232 operates on these inputs to sort the binary numbers generated on lines 222 and 224 into storage means 234, which stores the position of the selected microfiche frame which is the latter in the sequence A1 through H14, and into storage means 236, which stores the position of the selected microfiche frame which is the earlier one in the sequence A1 through H14. The output on lead 238 is a shift signal which causes the information serially stored in storage means 218 and 220 to be shifted out a bit at a time as each bit is properly sorted in storage means 234 and 236.

The binary numbers stored in 234 and 236, in the embodiment illustrated, are seven bit numbers; the four least significant bits corresponding to the column of the selected frames, and the three most significant bits corresponding to the row of the selected frames.

Four lines, shown as line 239, as well as four lines, shown as line 246, carry the four least significant bits from storage means 234 and 236, respectively, to select gate 242.

Three lines, shown as line 255 as well as three lines shown as line 257 carry the three most significant bits from storage means 234 and 236, respectively, to select gate 260. The select gates 242 and 260 respond to a signal appearing on line 258, connecting the four least significant bits from storage means 234 to comparator 262 in response to no signal on line 258, and connecting the four least significant bits from storage means 236 to comparator 244, and connecting the three most significant bits from storage means 236 to comparator 262 in response to a signal on line 258.

In addition, and also in response to a signal on line 258, select gate 254 connects a clocked pulse train on line 248 to counter 252, when no signal appears on line 258, and connects line 270 to counter 252 when a signal appears on line 258.

In the embodiment shown, counter 252 is a four bit counter with an automatic reset occurring when it reaches a count of 14. This reset signal also appears on line 253 and is used to advance the three bit counter 254. The four bits from counter 252, and the three bits from counter 254 are applied to comparators 244 and 262, respectively. Initially, counters 252 and 254 are reset to zero, and data clock rate selection control means 256 is set such that no signal appears on line 258.

When the PRINT button on the microfiche enlarger printer apparatus is depressed, the binary data in storage means 218 and 220 is sorted to determine which of the two frames selected is the latter in the sequence A1 through H14, and the corresponding data is transferred to storage means 234, the data corresponding to the earlier frame in the sequence A1 through H14 being transferred to storage means 236. Simultaneously with the completion of transfer of the data to 234 and 236, pulses are initiated on lead 248, causing counter 252 to increase its binary count. Each time it reaches a full count of 14 and resets, a pulse is generated which advances counter 254 a single binary count. The advancing binary number from counters 252 and 254 is continuously compared in the comparators 244 and 262, respectively, with the binary numbers passed by the select gates 242 and 260 from the storage means 234. When the pair of binary numbers input to comparator 244 coincide, a signal is generated on line 245. Similarly when the pair of binary numbers at the input to comparator 254 coincide, a signal is generated on line 266. When both comparators are simultaneously coincident and signals appear on lines 245 and 266 simultaneously, the data and clock rate selection control means 256 is set to a condition which provides a signal on line 258. This signal in turn causes the select gates 242 and 260 to transfer their through-put from storage means 234, to storage means 236, and to cause select gate 254 to transfer its through-put from line 248 to line 270. Whereas line 248 carried clocked pulses to rapidly advance counters 252 and 254, line 270 is pulsed only when a paper sheet enters the machine and is committed to printing. Thus counters 252 and 254 have been rapidly advanced to the count corresponding to the frame position selected, which is the latter frame in the sequence A1 through H14, at which time counters 252 and 254 are advanced only once for each paper sheet entering the machine. The four bit binary output of counter 252 servo controls the position of the microfiche in the axis orthogonal to the columns of microfiche frames hereinafter called the X axis. The three bit binary output of counter 254 servo controls the position of the microfiche in the axis orthogonal to the rows of microfiche frames, hereinafter called the Y axis. Thus, the two servos in following the binary position commands from counters 252 and 254 rapidly positions the microfiche, to bring the frame selected as the latter in the sequence A1 to H14, into alignment with the optical system. At this time paper is fed into the enlarger printer apparatus, and a signal is applied to line 272 which causes the X axis servo scan at a rate such that the projected image tracks the xerographic drum as it rotates. During this scan process, the paper reaches a point which commits it to printing, and a pulse is generated on line 270, causing the counter 252 to advance to the next frame in sequence.

When the scan process is complete, the signal on line 272 is removed, allowing the servos to reposition to the next frame in preparation for scanning the next frame.

When counter 252 reaches a full count of 14 and is reset to zero, the pulse appearing on line 253 causes counter 254 to advance one binary count, inhibits one paper feed operation, and also inhibits one scan cycle, thus allowing sufficient time for the X axis servo to reposition to the start of the next row.

The process of step and scan continues until the two pairs of inputs into comparators 244 and 262 are again in simultaneous coincidence. This occurrence signifies that the counters 252 and 254, and thus the microfiche position servos have sequence all frames. At completion of the scanning cycle, the data and clock rate control means 256 again generates a signal on line 258, returning the select gates 242, 254, and 260 to their initial condition. With line 248, carrying the clocked pulses, now connected through select gate 254, counter 252 and, in turn, counter 254 are rapidly advanced up through their maximum count, through zero and back to the count corresponding to that in storage means 234. When counter 254 reaches its maximum count, a pulse is generated on line 282, which passes through the malfunction inhibit gate 314 and appears on line 290. This pulse causes a counter in the enlarger printer apparatus to advance, signifying that the selected frames have been printed.

The above sequence of events continues until the number of pulses on line 290 totals the selected number of printings, at which time the circuits in microfiche position control means 230, are reset and the microfiche enlarger printer system enters a standby condition.

It should be noted that data corresponding to a second microfiche card can be inserted into the machine prior to the completion of the reproduction cycle on the first microfiche card since depressing the PRINT and CLEAR buttons transfers and clears the data from storage means 218 and 220. The signals generated by synchronization and interface means 250 such as paper enter and egress signals, are produced by standard xerographic processors such as the 3600 I manufactured by Xerox Corporation, Stamford, Connecticut. The scan command is a logic input generated on lead 272 which occurs when drum 36 is in the proper position for frame exposure and initiates the scan mode of the column servomotor at each frame position on the selected sequence. The scan command may be generated in a manner similar to that shown in U. S. Pat. No. 3,372,627.

Malfunction reset means 280 operates to provide logic control for automatic reprinting of copies which have been destroyed due to a paper jam within the machines. To do this, it must "back-up" counters 252 and 254 to the proper row and column; however, those counters only count forward. "Back-up" is thus provided by counting forward 111 places; i.e., a full count minus one, thus each 111 forward count is equal to one backup count. "Back-up" of counters 252 and 254 is initiated by a signal on line 264, operating on block 256 such that a signal appears on line 258. The select gates are thus no longer controlled by the comparator logic blocks 244 and 262, but by the signal on line 264. The clocked pulses on line 248 are thus applied to counter 252 to rapidly advance 252 and 254, while this advance is monitored via line 309 from the input to counter 252, and line 311 from data and clock rate selection control 256. Line 309 is used to monitor the number of advances (monitored by counter 310). Back-up control means (or counter) 310 generates one output pulse for 111 input pulses. The signal on line 311 into counter 310 holds the counter 310 at reset during normal operation. This line also performs an additional function as follows. When 111 input pulses brings counters 252 and 254 to a frame which is outside of the frames selected; i.e., they have backed up from the last frame selected in the sequence A1 through H14 to the next higher frame outside the selected range, counter 310 is held in reset until counters 252 and 254 advance to the first frame in the selected sequence. Thus, advancing from the last frame selected to the first frame selected is treated as a one frame "back-up."

In order to back up the proper number of frames, the number of paper sheets lost in the jam must be determined. This function is performed by a three bit counter 302. This counter is initially set to zero. During normal printing, a pulse is generated on line 270 each time paper enters the machine and is committed to printing. This pulse advances counter 302. Also, each time paper reaches a point which commits it to the output tray, a pulse is generated on line 284, which backs up counter 302. (This same counting applies to counter 304). When a paper jam occurs circuits, such as those utilized in the 3600 I, detect it and stop the machine and a pulse on line 286 initiates the malfunction reset sequence. The operator clears the machine of jammed paper and restarts the machine. The automatic malfunction reset means 312 initially inhibits paper feed with a signal on line 287. The machine runs, clearing itself of good pages, causing 302 and 304 to count down for each good page. When the machine is clear of paper, the remaining count is equal to lost pages. A pulse occurs on line 288 which initiates the second step of the malfunction reset operation as follows:

Initially, a signal is applied to 304 from malfunction reset control means 312 via line 313 which causes counter 304 to not respond to inputs. A signal is applied to line 264, initiating the "back up" process. Subsequent thereto gate 314 is turned off, inhibiting any further counting.

Each time counters 252 and 254 back up one frame (by advancing 111), the counter 302 is pulsed from malfunction reset control means 312 causing the remaining count to decrease one. This process continues until counter 302 is backed up to zero. Thus, since the count in counter 302 at the start of "back up" was representative of the number of lost pages, 252 and 254 have been caused to back up an equal number. When 302 reaches zero, the third step of malfunction reset is initiated as follows:

First, the signal on line 288 is removed, and paper feed resumes. Secondly, the signal on line 264 is removed, and the microfiche position control circuits return to normal operation.

Reprinting of the lost pages continues until counter 302 is again coincident with inhibited counter 304, indicating that all lost copies have been reprinted. Finally, gate 314 is again closed to permit normal counting, and the malfunction reset cycle is complete.

The invention as described hereinabove provides a novel data insertion means including a novel pressure sensitive panel, light emitting diodes associated with each panel position for providing a visual indication to the operator of the selected panel position, and logic and storage means coupled to the panel and which generates coded binary data corresponding to a first and last selected panel position within a predetermined time duration. The novel data insertion apparatus described hereinabove is, in a preferred embodiment, utilized in a microfiche enlarger printer apparatus, such as that described in U. S. Pat. No. 3,372,627, for reproducing microimages within a selected frame sequence on a microfiche card.

While the invention has been described with reference to its preferred embodiment, it will be understood by those skilled in the art that various changes may be made and equivalence may be substituted for elements thereof without departing from the true spirit and scope of the invention. In addition, many modifications may be made to adapt a particular situation or material to the teaching of the invention without departing from its essential teachings.

What is claimed is:

1. In a machine for producing enlarged reproductions of selected frames of microimages arranged in columns and rows on a microfiche card onto sheets of copy paper in response to operator inserted input data, said machine including a micro-fiche transport mechanism for positioning said microfiche card relative to the optical axis of a light projecting system, improved data insertion means comprising:

a. a panel having a front surface which includes a plurality of panel positions having a format corresponding to the microfiche card format such that the number and arrangement of panel positions on said panel front surface corresponds to the column and row arrangement of microimages on said microfiche card, and b. means responsive to operator actuation of selected panel positions on said panel for generating position signals corresponding to selected starting and terminating frames, said position signals controlling the positioning of said microfiche transport mechanism whereby the microimage frames that extend between the selected starting and terminating frames are reproduced.

2. The data insertion means as defined in claim 1 further including display means associated with each panel position such that the actuation of a selected panel position causes the display means associated therewith to be energized.

3. The data insertion means as defined in claim 2 wherein said display means comprises light emitting diodes, the energization of said diodes causing visible light to be emitted therefrom.

4. The data insertion means as defined in claim 1 wherein said panel comprises:

a. a first sheet of transparent material having a plurality of holes formed thereon, the arrangement and number of said holes corresponding to the microfiche card format, b. a second sheet of material having first and second surfaces, said first surface overlying said first material sheet, said second surface having alphanumeric symbols formed thereon in registry with the holes formed on said first sheet of material, c. a conductive material overlying said second surface of said second sheet of material, d. a sheet of insulating material overlying said conductive material, said insulating material having a plurlaity of holes thereon in registration with the holes formed on said first sheet of material, and e. a printed circuit board having a plurality of metallic contacts formed on one surface thereof, operator actuation of a selected panel position causing said conductive material to momentarily close contacts corresponding thereto, whereby a signal is applied simultaneously to two conductors associated with the selected panel position on said printed circuit board for generating signals indicating the location of said selected panel position relative to a predetermined coordinate system.

5. The data insertion means defined in claim 4 further including a plurality of transparent areas formed on the first surface of said second sheet of material, a transparent area associated with each panel position, a plurality of apertures formed through said conducting sheet, said insulating sheet and said printed circuit board, said apertures being aligned with said transparent areas, a plurality of display means mounted in said apertures adjacent said transparent areas, and means for energizing the display means adjacent an actuated panel position.

6. The data insertion means of claim 1 further including first and second storage means responsive to said position signals whereby data corresponding to the initially selected starting and terminating frames of a first microfiche card is stored in said first storage means and data corresponding to the starting and terminating frames of a second microfiche card is entered into said second storage means prior to reproduction of the microimages between the starting and terminating frames on said first microfiche card.

7. The data insertion means as defined in claim 1 further including means for storing the position signals corresponding to the first and last selected panel positions, said first and last selected panel position corresponding to the selected terminating and starting frames, respectively.

8. The data insertion means as defined in claim 1 further including a. means for positioning said microfiche transport mechanism whereby a frame which was not reproduced due to machine malfunction is positioned adjacent said optical axis, and b. means for initiating reproduction of the frame sequence extending between the non-reproduced frame and the terminating frame when said non-reproduced frame is positioned adjacent said optical axis.

9. A pressure sensitive panel comprising:

a. a first sheet of transparent material having a plurality of holes formed thereon, b. a second sheet of material having first and second surfaces, said first surface overlying said first sheet of material and including a plurality of transparent areas formed thereon, said second surface thereof having alpha-numeric symbols formed thereon in registration with the holes formed on first sheet of material, c. a conductive material overlying the other surface of said second sheet and including a plurality of apertures formed thereon, d. an insulating sheet having a plurality of holes thereon overlying said conductive material, said insulating sheet holes being in registration with the holes formed on said first sheet of material, said insulating sheet further including a plurality of apertures thereon, e. a printed circuit board having a plurality of metallic contacts formed on one surface thereof, pressure applied to said conducting material through the holes on said first sheet of material causing said conductive material to close said contacts, said printed circuit board further including a plurality of apertures, the apertures in said conductive material, said insulating sheet and said printed circuit board being in registry with each other and the transparent area on the first surface of said second sheet of material, and f. a plurality of light emitting diodes mounted in said aligned apertures and adjacent to said transparent areas on the first surface of said second sheet of material, the terminals of each emitting diode being coupled to conductors formed on the other surface of said printed circuit board whereby a selected light emitting diode is caused to emit light therefrom when the associated conductors are energized.

10. Apparatus for positioning a support member rapidly to a first position, represented by $x1$, $y1$ coordinates, from an initial position and sequentially from said first position to a second position, represented by $x2$, $y2$ coordinates, comprising:

a. means for producing first and second digital signals representing said $x1$, $y1$ and $x2$, $y2$ position coordinates, respectively, b. first and second storage means for storing said first and second digital signals, respectively, c. first comparator means, one input of which is alternately coupled to said first and second storage means, for comparing a pair of inputs applied thereto, a signal being generated by said first comparator means when said inputs are in coincidendence, d. second comparator means, one input of which is alternately coupled to said first and second storage means, for comparing a pair of inputs applied thereto, a signal being generated by said second comparator means when said inputs are in coincidence, e. a first counter the output of which is connected to the other input of said first comparator means, said first counter being capable of being decremented from an initial count to a predetermined count, said first counter being reset when its count reaches said predetermined count, the output of said first counter further being utilized to position said support member in the x coordinate direction, f. a second counter the output of which is connected to the other input of said second comparator means, the output of said first counter being coupled to the input of said second counter, the output of said second counter further being utilized to position said support member in the *y* coordinate direction, g. means for decrementing said first counter at a first clocking rate and for coupling said first and second comparator means to said first storage means, the count in said second counter being decremented each time said first counter is reset, said support member being positioned from said initial position to said *x*1, *y*1 coordinates as said first counter is decremented, and h. means responsive to the simultaneous coincidence of said comparators for decrementing said first counter at a second clocking rate, different from said first clocking rate, and for connecting the output of said second storage means to said first and second comparators, said support member being sequentially positioned from said *x*1, *y*1 coordinates to said *x*2, *y*2 coordinates as said first counter is sequentially decremented.

11. The positioning apparatus as defined in claim 10 further including means for repositioning said support member in the direction towards said first position at the occurrence of a signal generated by means external to said positioning apparatus.

* * * * *